US005824931A

United States Patent [19]

Papadopoulos

[11] Patent Number: 5,824,931

[45] Date of Patent: Oct. 20, 1998

[54] ELECTRONIC INFORMATION AID

[75] Inventor: M. G. Papadopoulos, Wellington, New Zealand

[73] Assignee: Musacus International Limited, Wellington, New Zealand

[21] Appl. No.: 925,023

[22] Filed: Sep. 8, 1997

Related U.S. Application Data

[63] Continuation of Ser. No. 481,315, filed as PCT/NZ94/00020, published as WO94/20950, Sep. 15, 1994, abandoned.

[30] Foreign Application Priority Data

Mar. 12, 1993 [NZ] New Zealand .......................... 247140

[51] Int. Cl.[6] .................................................... G09B 15/02

[52] U.S. Cl. ............................................ 84/474; 84/477 R

[58] Field of Search ......................... 84/474, 484, 477 R, 84/470 R, 601, 602, 454

[56] References Cited

U.S. PATENT DOCUMENTS 4,121,488 10/1978 Akiyama .................................. 84/720

4,134,326 1/1979 Hutton ..................................... 84/474

4,295,406 10/1981 Smith ................................... 84/470 R

FOREIGN PATENT DOCUMENTS

1403086 A1 6/1988 U.S.S.R. .

*Primary Examiner*—Cassandra C. Spyrou

*Assistant Examiner*—Shih-yung Hsieh

*Attorney, Agent, or Firm*—Fulwider Patton Lee & Utecht LLP

[57] ABSTRACT

An electronic information aid displays and calculates the relationships between a series of individual integers which may comprise alphabetical and/or numerical indicia or a series of visual and/or aural indicia or a combination of any one or more of the integers. The aid has a number of reference rings (23a–23g) each of which is independently rotatable but maintained in a predetermined spatial relationship with each other. Each reference ring (23) includes a number of segments each of which displays indicia which corresponds to an integer. When the rings (23a–23g) are rotated so the segments are aligned into an active strip in accordance with a coding system, the segments will display the interrelationship between the integers. Each segment within the active strip can be activated to initiate an aural or a visual response.

15 Claims, 10 Drawing Sheets

SWITCH READ

ROUTINE FORMS INITIAL NOTE TABLE VALUES FROM SWITCHES ON EACH REFERENCE RING

NOTE VALUE(i) POINTS TO THE PHASE INCREMENT REQUIRED TO PLAY EACH NOTE

ELECTRONIC INFORMATION AID

This application is a continuation of application Ser. No. 08/481,315, filed as PCT/NZ94/00020, Mar. 11, 1994, published as WO94/20950, Sep. 15, 1994, abandoned.

This invention relates to an electronic information aid. In particular the device relates to an aid which can be used to assist in the display and calculation of the relationships between a series of individual integers and which can provide an aural or visual reproduction of a specific integer and/or the relationship between integers. The integers may comprise alphabetical and/or numerical indicia or they may comprise a series of visual and/or aural indicia or a combination of any one or more of the integers.

TECHNICAL FIELD

In a highly preferred form, the invention relates to a device which can be used to assist in the calculation of various forms of musical scales and which can display the scales in all keys simultaneously and which can provide an aural reproduction of a selected musical note or a series of notes or a chord of musical notes of the calculated scales. One form of device which will provide a visual reproduction of the relationship between musical notes is described in U.S. Pat. No. 4,134,326. Such a device had a number of annular rings rotatably mounted on an axle. The names of the notes of the musical scale were printed on the peripheral surface of each ring so that when the rings are appropriately aligned, musical relationships can be determined. The primary purpose of this prior art device is to assist in the transposition of chords. To use the device, the key or tonic note for a particular chord is selected on a particular ring and each successive ring is aligned with the other notes on the chord. The rings are then locked in place and the rings rotated as a unit so the corresponding type of chord of another key can be read off the device with the assistance of a moveable viewing screen.

BACKGROUND ART

In British Patent Specification 2119154A there is described a musical scale indicator having two faces. One face the obverse face and is comprised of eight concentric circles which overlap each other. The circles are divided into twelve segments of each size and each segment is marked with the name of a note or notes. The second face, the reverse face has a window through which a number corresponding to the name of the note on the obverse face can be viewed.

U.S. Pat. No. 4961362 describes a device which can be used to calculate the chord and key construction for a musical composition. This device uses a fixed wheel which has a number of segments which contain indicia. Specific segments can be viewed through a window in a window mask which is placed over the wheel. The device also includes a base which extends radially from the wheel and which carries additional indicia which include chord indications. Certain of these chord indications are assigned specific colours.

In European application WO 93/25995 there is described a music teaching aid consisting of a plurality of reference rings each of which is movable independently but maintained in a predetermined spatial relationship with a reference ring or rings contiguous thereto. Each of the reference rings has a plurality of segments which are individually identifiable such that when segments of the reference rings are aligned in accordance with a predetermined coding system, corresponding segments of each successive ring will represent the notes of a non-chromatic scale. The segments are identified by a coding which consisted in specific colours or range of colours on the surface of the reference rings. In a modification of that invention, the distinguishing features on the segments were formed by inscribing indicia on the reference ring which either consisted of or incorporated colours to indicate a particular scale or scales of notes.

It is an object of the present invention to provide an electronic device to assist in the calculation and display of information and to demonstrate the interrelation of that information.

DISCLOSURE OF THE INVENTION

Accordingly one form of the invention may be said to comprise an electronic information aid comprising;

- a plurality of reference rings each of which is independently movable and maintained in a predetermined spatial relationship, each reference ring having a plurality of segments each of which is identifiable by a predetermined coding system; and
- an active strip;

characterised in that when selected segments of the reference rings are aligned in accordance with the predetermined coding system into the active strip, the aligned segments will represent a predetermined relationship between the segments and wherein one or more of the segments in the active strip can be activated to initiate a visual or audible response.

The device will include a requisite number of reference rings to enable the relationship between the various integers to be displayed. If the device is to be utilised to display the calculation of various forms of musical scales, the device will preferably include seven reference rings, but the number of rings can be varied depending upon the type of scales displayed. In addition to the reference rings, the device to assist in the calculation of music scales can include a further ring or rings that may display note time values, in particular whole notes, half notes, quarter notes, eighth notes, sixteenth notes, and thirty second notes etc. The rings may also display the corresponding rest values, that is whole note rests, half note rests, quarter note rests, eighth note rests, sixteenth note rests and thirty second note rests etc either on the same ring or on an additional ring or rings. Alternatively means can be employed so that rhythms can be programmed by tapping the segments at the tempo required.

In a yet further modification of the invention the device may include a reference ring that may display musical chord qualities, such as 6ths, 7ths, 9ths, 135 triads, 351 triads, 513 triads, intervals and inversions of the above.

In yet another modification, the device may include a memory capable of storing the selected information for later reproduction, either directly from the device or through another medium such as a computer processor.

In yet another modification, the device may include means to generate successive repetitive pulse capable of being reproduced as an audible signal and thereby to act as a metronome. Such a modification would preferably include means to vary the delay between successive pulses within a predetermined range. In a variation of this modification, the metronome can also act as a time controller for all stored compositions and for the tempos for all modes of operation.

Preferably each reference ring is coaxial to each successive reference ring and each ring is independently mounted on a cylindrical housing.

Preferably the coding system comprises a series of predetermined colours.

Preferably each reference ring is coaxial with each other reference ring and are mounted on a housing which may be of a disc shape, a cone shape or a barrel shape or other shape capable of displaying and maintaining each reference ring in the correct spatial relationship with the remainder of the reference rings.

Preferably the coding system is such that it will stimulate a number of senses simultaneously while accessing the information.

BRIEF DESCRIPTION OF THE DRAWINGS

A preferred form of the invention will now be described with the aid of the accompanying drawings wherein.

MODES OF CARRYING OUT THE INVENTION

Figure 1:
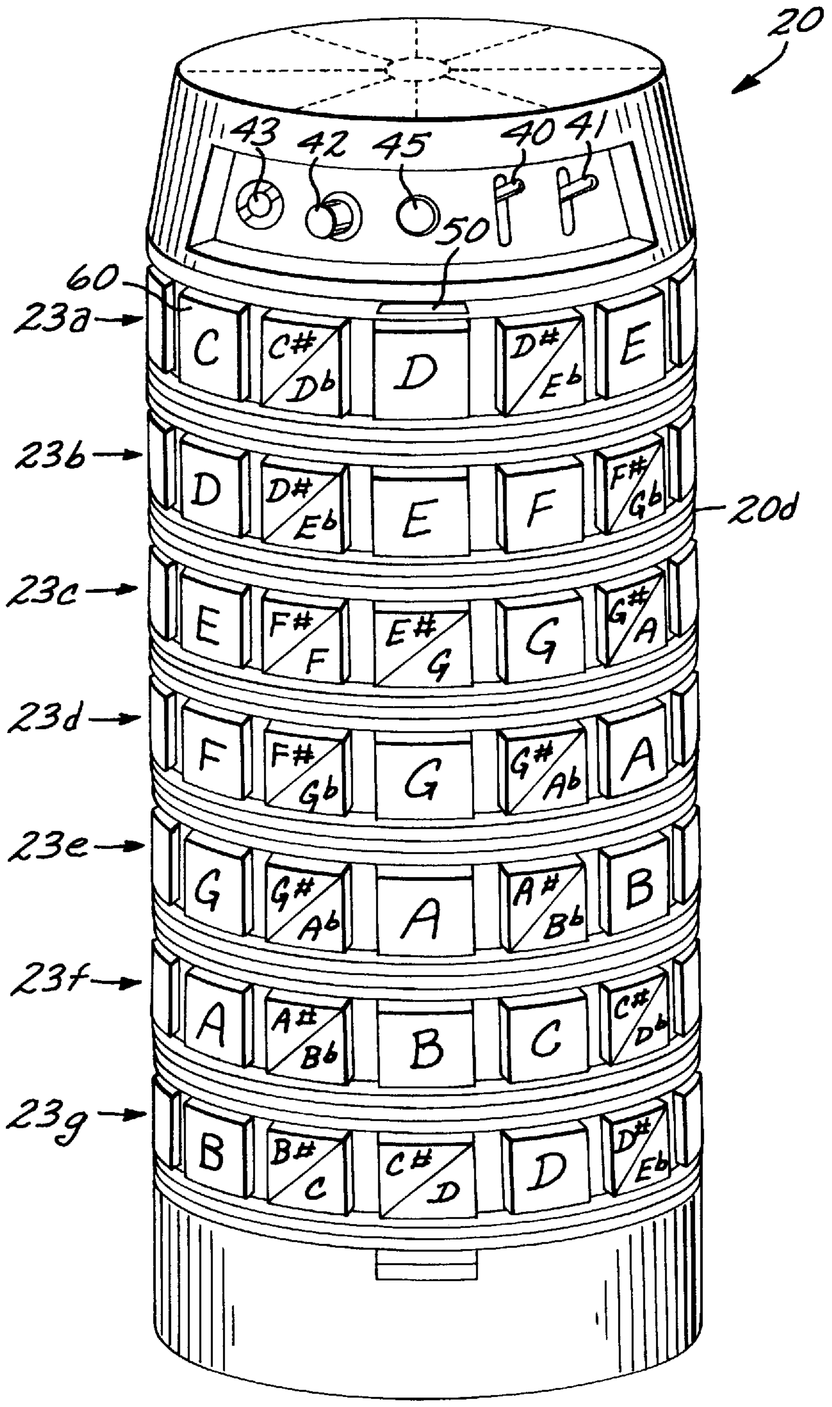
FIG. 1 is a view of one preferred form of the device.

Referring to the drawings and in particular FIG. 1, the device includes a housing 20 on which a plurality of reference rings 23*a*, 23*b*, 23*c*, 23*d*, 23*e*, 23*f* and 23*g* are mounted. As shown in this Figure, seven reference rings are utilised. This is the preferred number of reference rings that would be utilised when the device is to demonstrate a musical scale. The number of reference rings can be varied.

One form of the housing comprises a plurality of cylindrical sleeves 20*a*, with the number of sleeves corresponding to the number of reference rings. Each sleeve 20*a* includes an external annular land 20*b* and an internal annular land 20*c* so that successive sleeves can be stacked co-axially and maintained in the stacked condition by the external annular land of one sleeve engaging with the internal annular land of the contiguous sleeve. Each sleeve 20*a* also includes an annular flange 20*d* which projects radially from the sleeve and forms an annular spacer element. As can be seen from FIG. 2, each reference ring 23*a*–23*g* comprises a sleeve, the inside diameter of which is a neat fit over the outside periphery of the respective sleeve 20*a* so it can be freely rotatable thereon. In its assembled condition, the sleeves 20*a* are suitably clamped together to form the main part of the housing 20*a* and in such a condition each reference ring will be freely rotatable on its respective sleeve and independently rotatable of the remainder of the reference rings.

The peripheral surface of each reference ring 23*a*–23*g* is divided into segments 28 each of which displays a specific indicia. Depending upon the form of the device, the number of segments will vary to enable each reference ring to include a complete sector or sectors of the information that is to be displayed. For instance, if the device is to be used to demonstrate musical scales, then the reference ring will include twelve segments 28 and the indicia on each segment will represent a note of the chromatic scale.

Each segment 28 displays a code which may be visual and/or tactile. In a highly preferred form the code may be composed of a particular identifying colour which is preferably taken from the colour of the rainbow. While it is preferred the colours be prismatic, this is not essential. The essential requirement is that the codes are chosen to identify the integers of the information to be displayed. As an example, if the device is to be used to demonstrate a musical scale, then the scales and the notes are assigned specific colours which will define an inter-relationship with the manner in which notes change. Dependent upon the form of coding adopted, the coding can comprise a border within the segment, or a border within the segment with the remainder of the segment being composed of the same or different coding and the character representing the particular tone may consist of a contrasting colour, a neutral colour, no colour or a combination of colours and/or a neutral colour and or no colour. In another form the segment can be composed completely of colour in which the character representing the particular tone may consist of a contrasting colour, a neutral colour or no colour or a combination of colours and/or a neutral colour and/or no colour.

In another form of the invention, each segment can be identified by means other than or combined with colours. Typical examples of other forms of coding would be the use of lights so the segments incorporate a pattern or pattern of lights. In yet another form the coding can consist for instance of dot patterns such as is used in the Braille system. In a yet further form, the identification means can be a series of numbers which can be individually coded in accordance with the predetermined coding system to represent the indicia.

Each segment 28 is formed so it can be activated to produce a visual or audible response which corresponds to the character displayed on the segment. Various methods of activating or initiating the response can be utilised such as by using keys in the form of press buttons, touch sensitive surfaces, proximity devices and other means as are known in the art.

In a highly preferred form, each segment 28 is formed into a key which is a push button switch so that when the segment is pressed, the switch will be capable of making or effecting an electrical contact to enable the initiation of the audible or visual response.

In the embodiment shown in FIG. 1, wherein the device has been adapted to demonstrate the relationship between the various notes of a musical scale, the reference rings have been rotated to a position whereby the notes comprising the D Major scale are displayed in a line parallel with the longitudinal axis of the device. Each segment in this scale includes the same prismatic colour of the rainbow.

Figure 2:
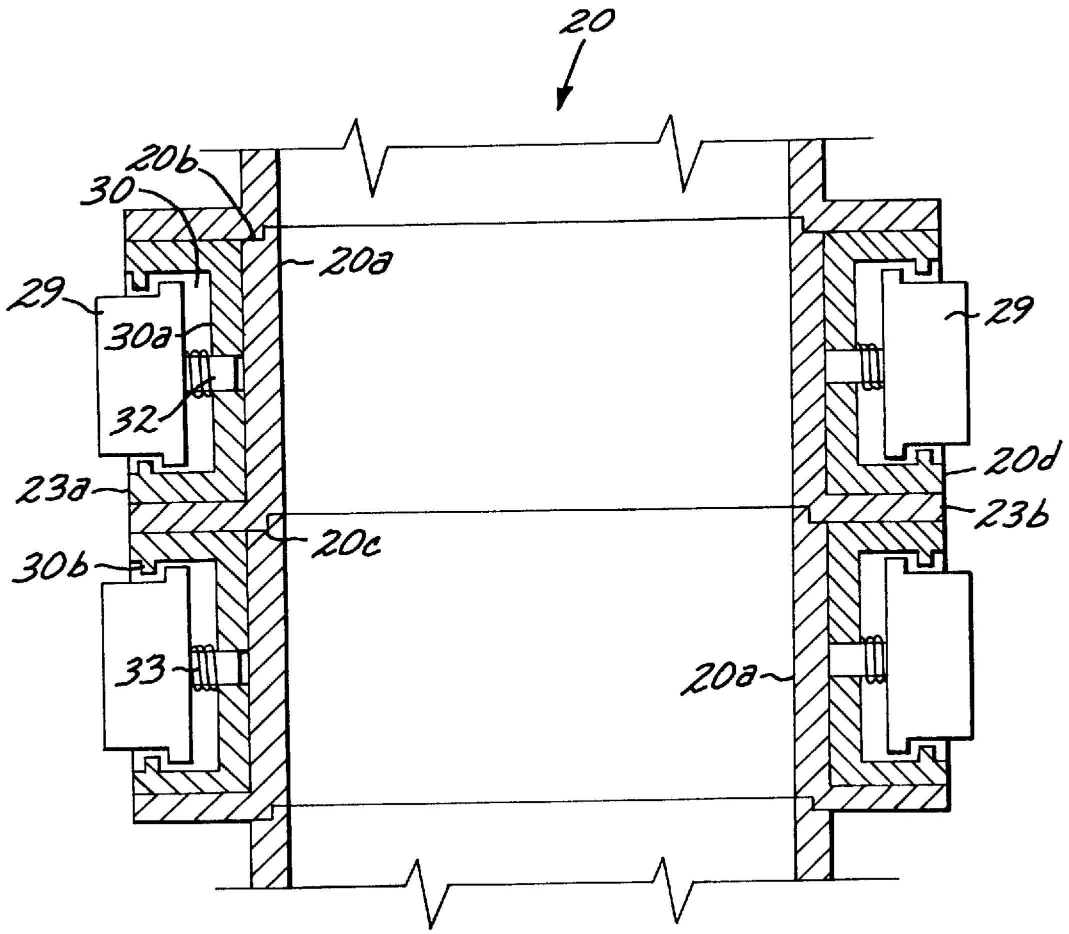
FIG. 2 is a cross sectional view of part of the device shown in FIG. 1.
Figure 3:
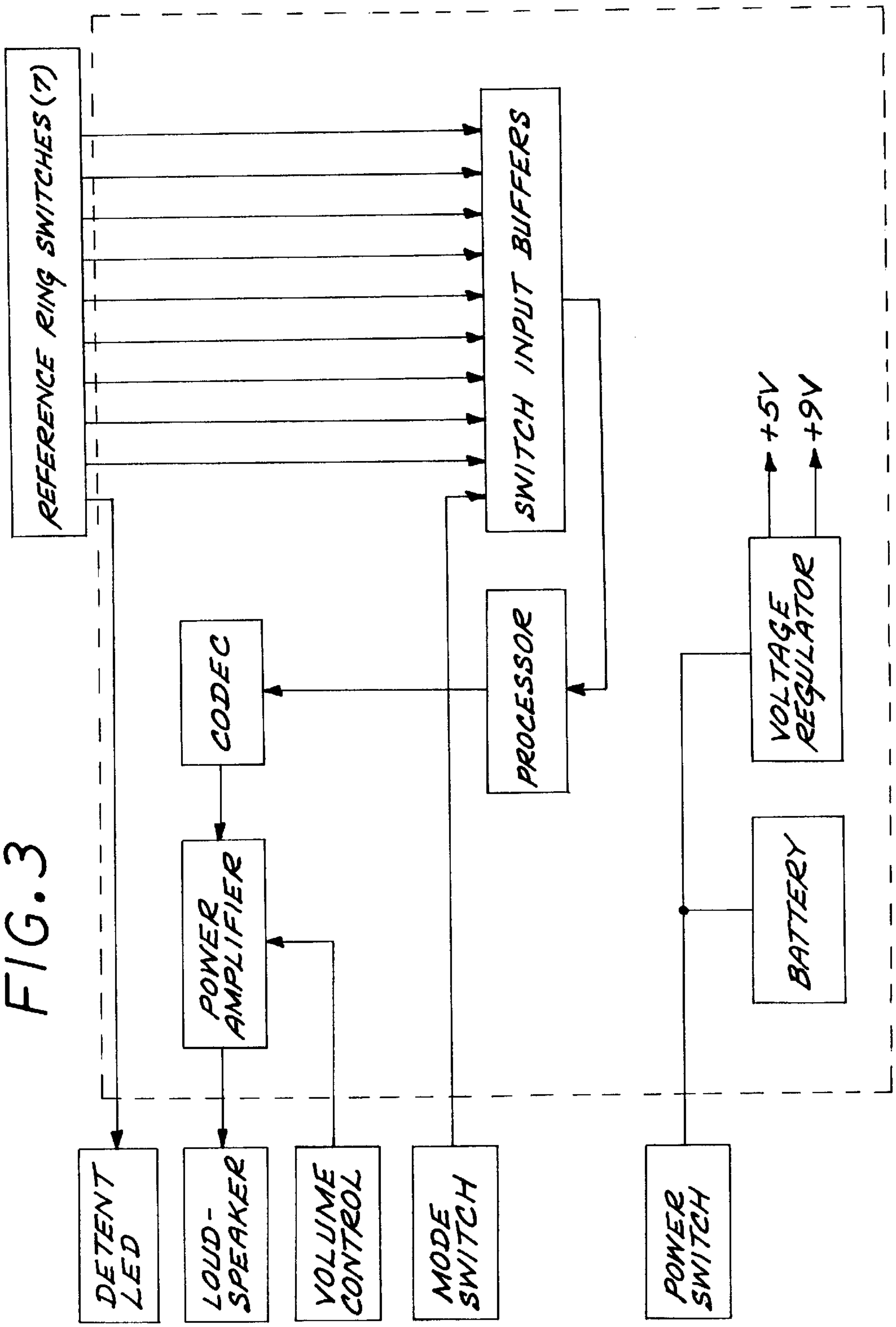
FIG. 3 is a block diagrammatic view of one form of electrical circuitry that operates the device shown in FIG. 1.
Figure 4:
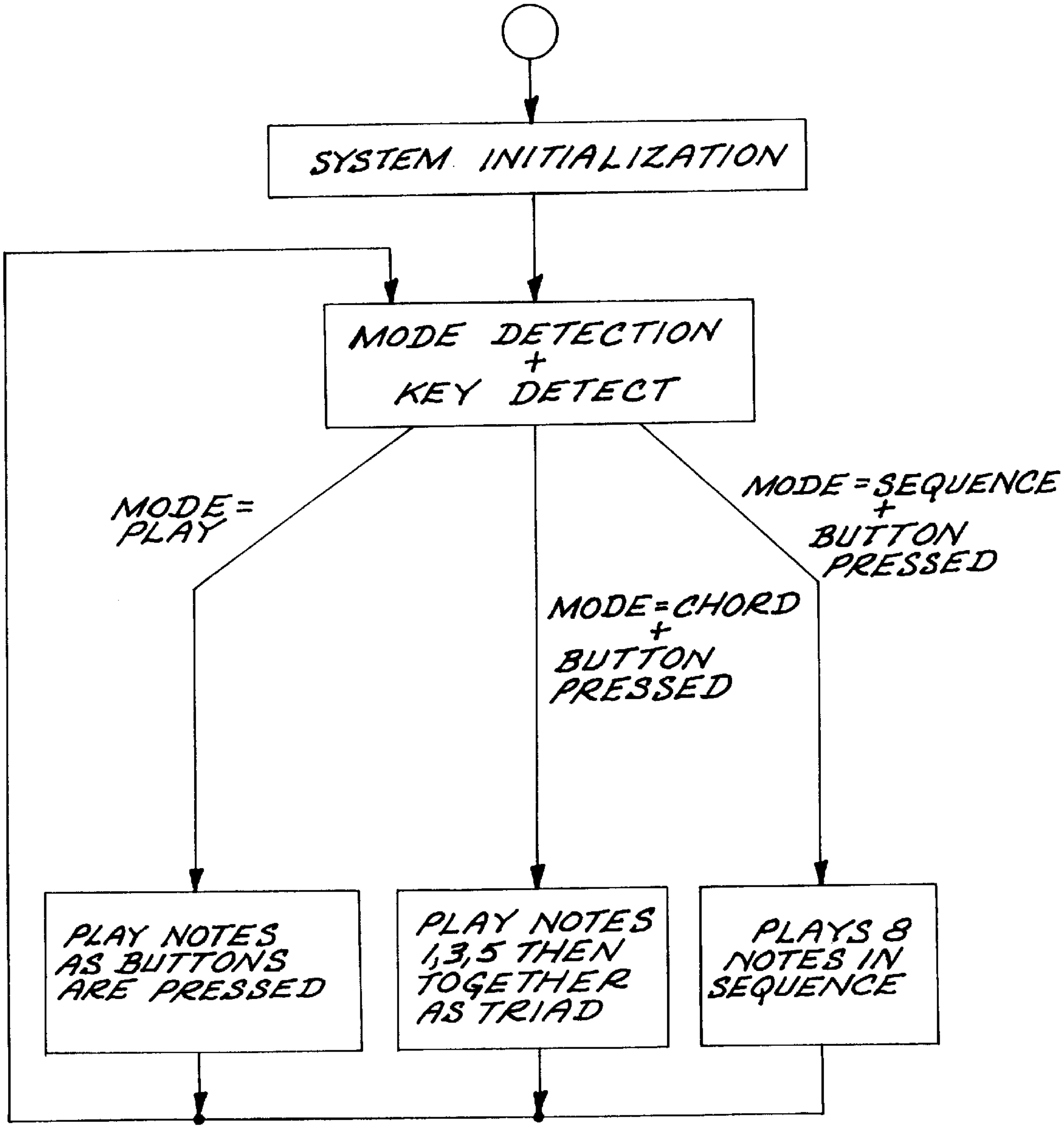
FIG. 4 is a simplified flow diagram of the initialization stage of a software program suitable for use with a device such as that illustrated in FIG. 1.
Figure 5:
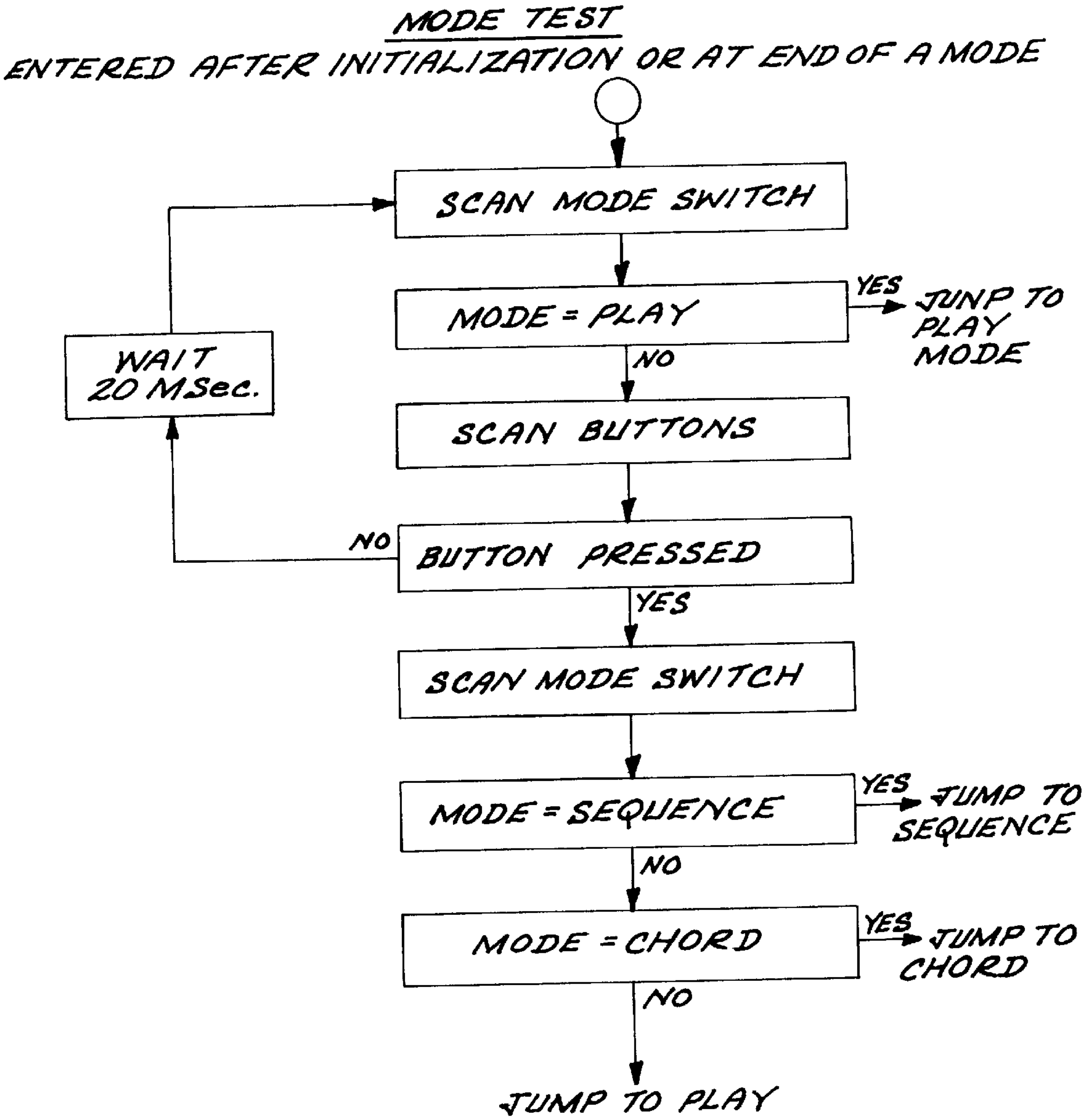
FIG. 5 is a software flow diagram of a mode test program.
Figure 6:
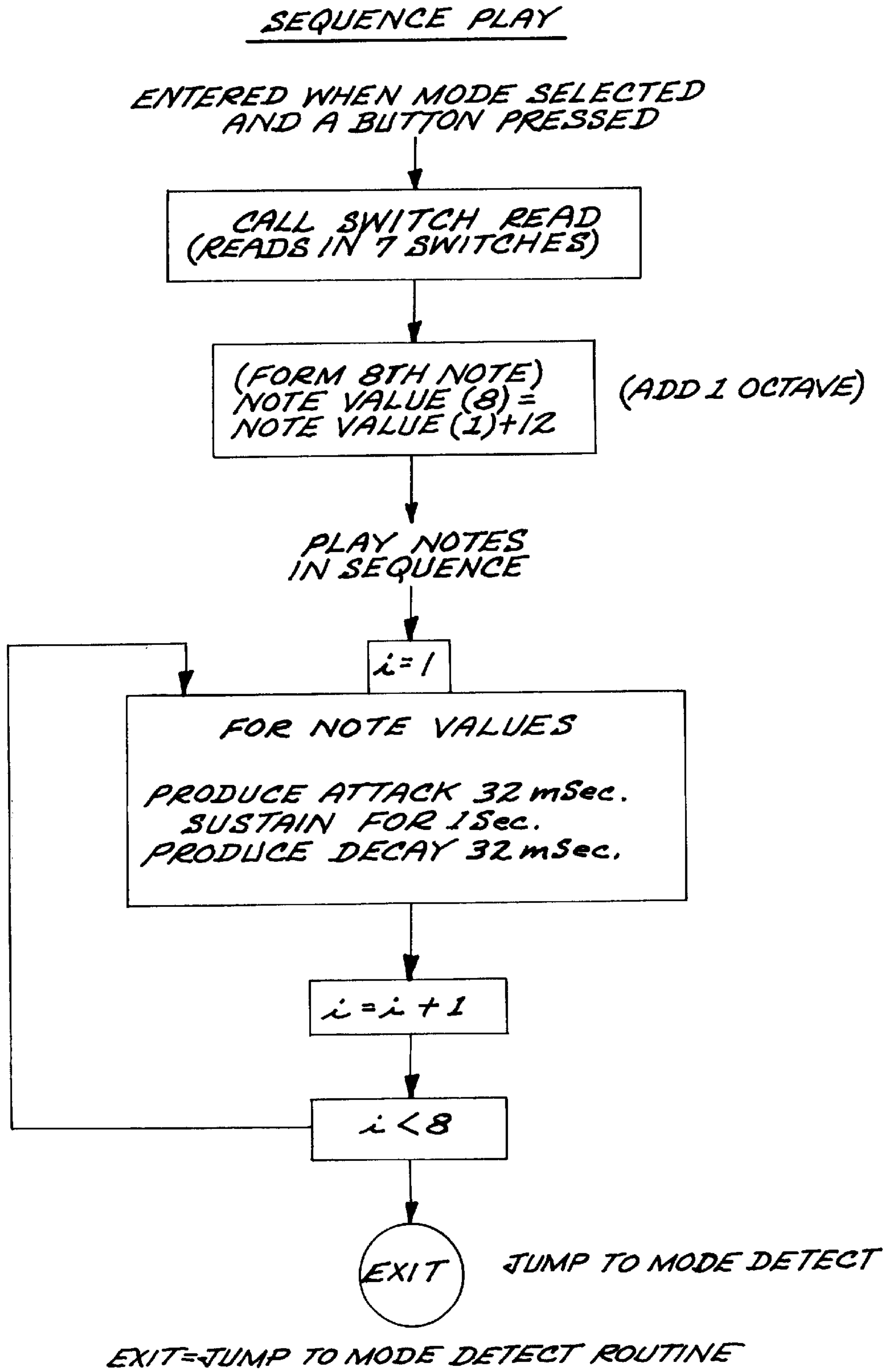
FIG. 6 is a software flow diagram of a sequence play mode program.
Figure 7:
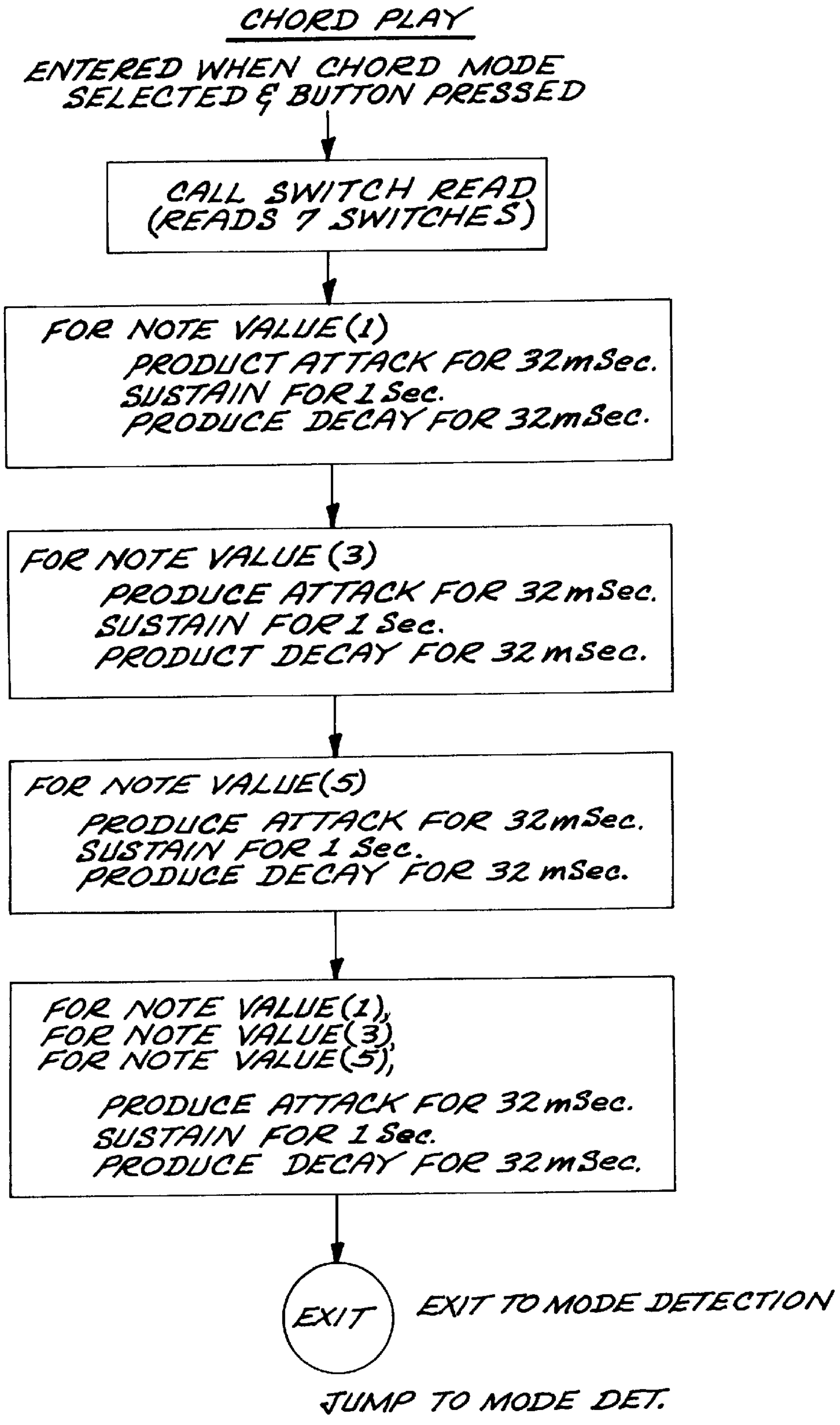
FIG. 7 is a software flow diagram of a chord play mode program.
Figure 8:
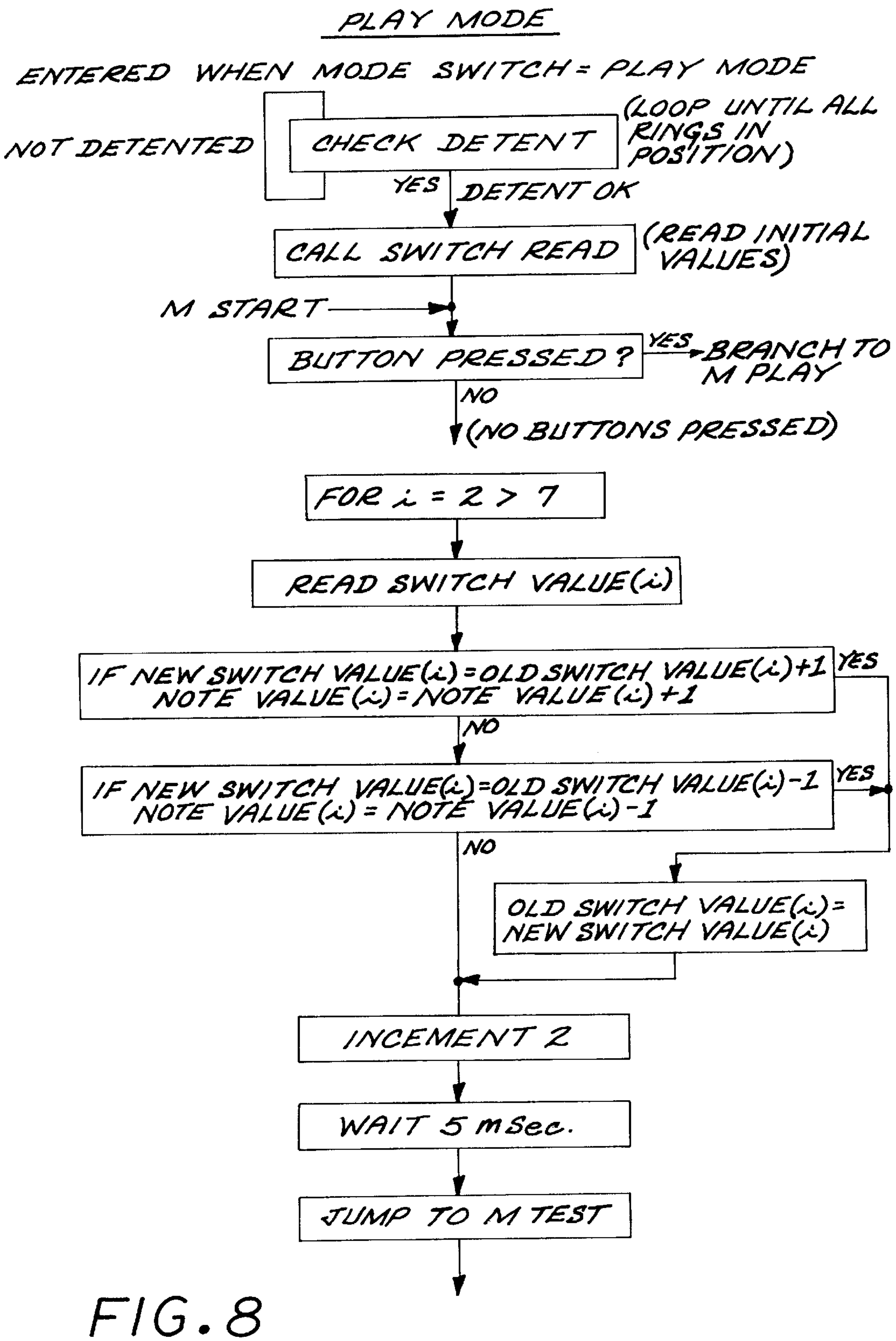
FIGS. 8 and 8 (ctd) is a software flow diagram of a play mode program.
Figure 8A:
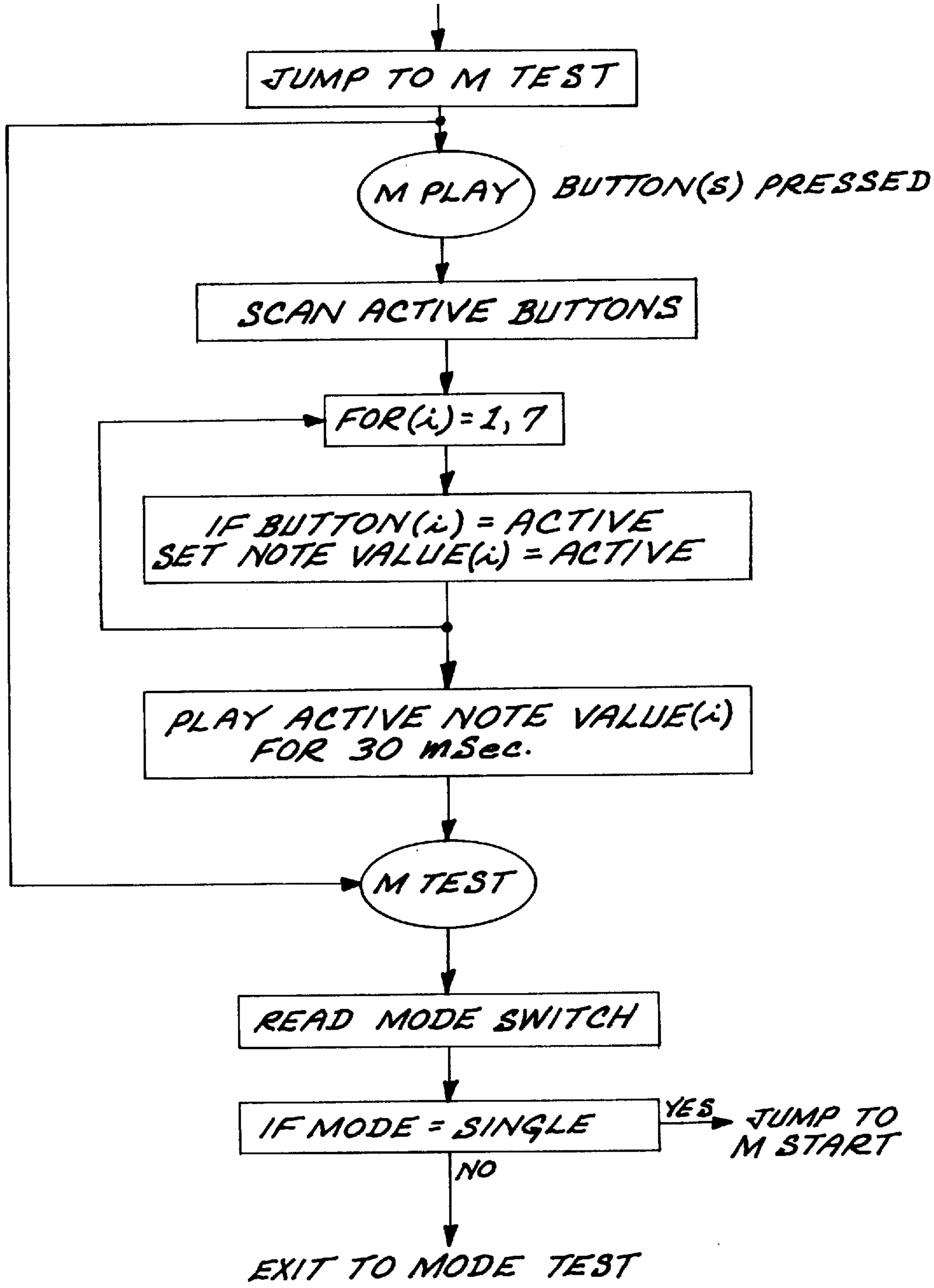
Figure 9:
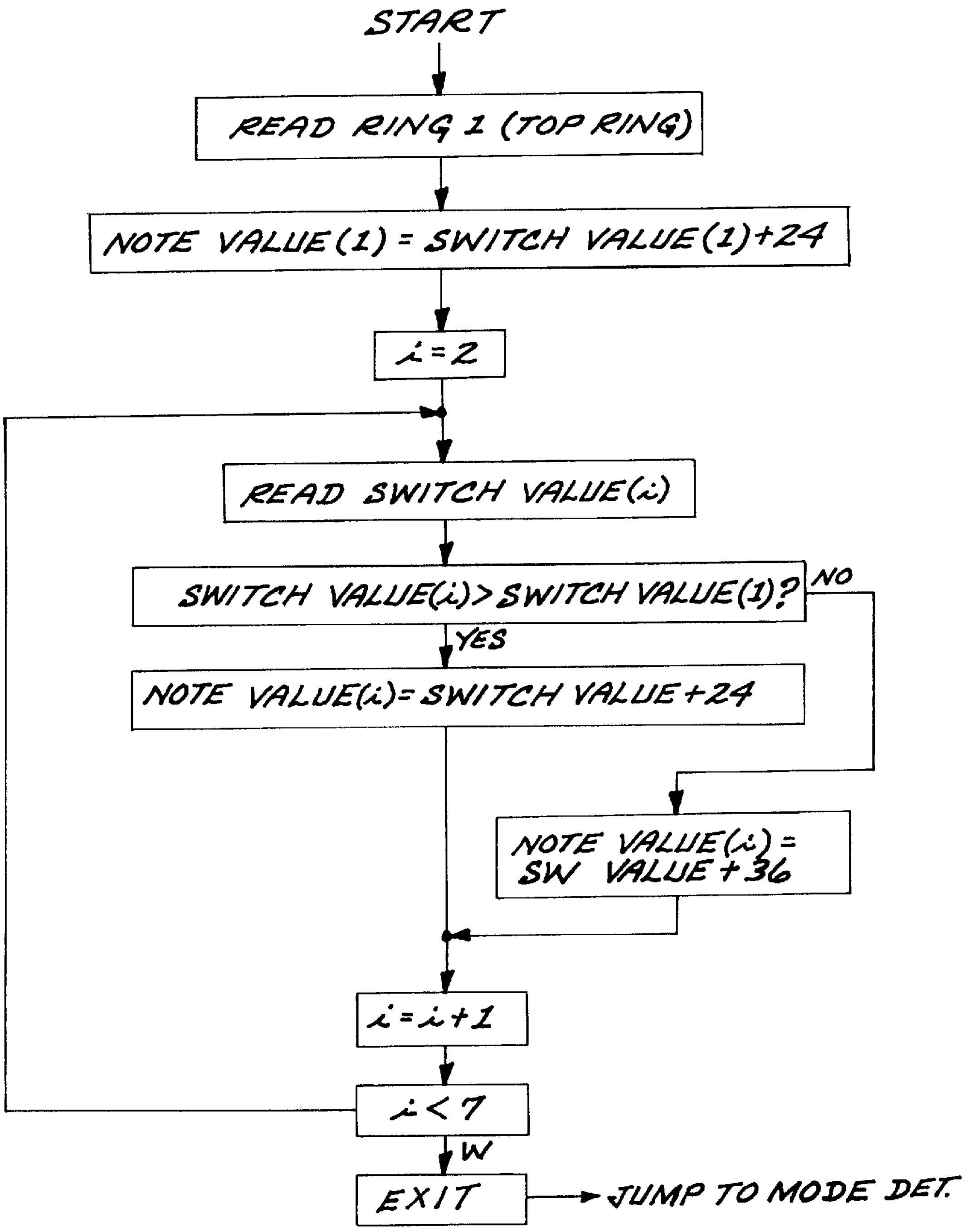
FIG. 9 is a software flow diagram of a switch reading program.

FIG. 2 illustrates one form of a push button key construction which is particularly suitable for the device indicated in FIG. 1. As shown in this Figure, a segment 28 includes a key 29 which may be suitably constructed from a plastics material or the like as is known in the art. The key 29 is in the form of a button and is housed within a recess 30 formed in the reference ring 23*a* with the recess 30 being so formed that the key 29 can have limited radial movement within the recess 30. This movement is obtained by the combination of a pin 32 projecting from the base 30*a* of the recess so as to project substantially radially within the recess 30. The key 29 is provided with a suitable blind bore (not shown in the drawings) into which the pin projects so the key 29 may have a reciprocating movement on the pin 32. Suitable spring means such as the coil spring 33 which is in compression and which is positioned around the pin 32 is provided so the key 29 will be urged towards its most radially outward position.

The key 29 may also include an annular flange 29*a* which will contact the shoulder 30*b* projecting radially inwardly from the wall of the recess 30 to limit the outward movement of the key.

Means (not shown in the drawings) are provided so that when the key 29 is pressed, this forms an electrical switch which will enable initiation of a software program to produce an audible and/or visual response corresponding to the segment selected and to the mode selected.

Various forms of keys capable of forming an electrical switch for activating or initiating a tone or tones can be utilized and the construction illustrated in FIG. 2 is merely one indication of one of the many different methods which can be utilized for the present invention. The essential requirement is that by pressing or touching the segment, the generation of an audible or visual response corresponding to the indicia on the face of the segment will be initiated. Consequently the key can operate as an electrical/mechanical switch or a part electrical/electronic or a purely electronic switch as will be known in the art.

Preferably but not necessarily the device may also include additional features such as an on/off power switch indicated at 40, a mode select switch indicated at 41, a signal volume control indicated at 42 and an audio or radio frequency output jack such as indicated at 43. The device also preferably includes an indicator light 45 which may be suitably connected with the electrical circuitry so that when a series of segments are correctly aligned as will be hereinafter described, the indicator light will glow.

A registration indicator 50 is also preferably provided to give visual indication of the manner in which the segments on successive reference rings must be aligned to produce the desired results. When all segments on the reference rings are correctly aligned between the registration indicator 50 they then occupy and form an active strip and each segment can then operate as an active switch. In a modification of the invention and for specific purposes, the device can be constructed so that more than one active strip can be utilised. It is also contemplated that the active strip could be widened and a suitable holder or cage included.

The following illustrates one of the preferred arrangements for identifying the characters on the reference rings when the device has been adapted to demonstrate the relationship of the notes of a musical scale.

Starting from the character referenced 60 on the reference ring 23*a* and which represents the note 60, and moving around the reference ring from left to right, each diatonic note of the C Major scale (C,D,E,F,G,A,B) is ascribed a prismatic colour in the order they appear in a rainbow. Hence, the segment containing the character C appears red, the segment containing the character D appears orange, the segment containing the character E appears yellow, the segment containing the character F appears green, the segment containing the character G appears blue, the segment containing the character A appears indigo and the segment containing the character B appears violet. This form of coding will initiate a coding system that will enable the user to identify the notes in any major scale without any prior musical knowledge. When all the orange segments are aligned vertically, the device will display all the notes in the D major scale.

Whilst still moving along the reference ring 23*a* horizontally, the chromatic notes that fall between the diatonic notes of the C scale, being notes that are the first or tonic note of a major scale, receive an intermediate colour. For example, E♭ on the reference ring would appear a flatter tone of yellow, enabling it to be identified as a scale in its own right, whilst also demonstrating it to be of a flatter tone both visually and aurally than the following note E.

In the case of major scales that are enharmonic equivalents, that is scales that are identical in musical pitch but can be written two different ways (i.e. C♯ & D♭), two intermediate colours are adopted i.e. C♯ is ascribed a brighter shade of red whilst D♭ is ascribed a flatter shade of orange.

There are three enharmonic major scales on the device, they are the B Major scale also known as the C♭ Major scale, the C♯ Major scale also known as the D♭ Major scale and the F♯ Major scale also known as the G♭ Major scale.

The other notes that appear on the reference ring in triangular segments 61 are not coloured but appear white are A♯, D♯ and G♯. These notes are not coloured as they do not form the tonic or basis for an accepted major scale.

Major scales must always follow alphabetically, so as such where an enharmonic note appears in a scale the note that is in correct alphabetical sequence is the one coloured to match the scale. For example, in the F Major scale B♭ appears green and its enharmonic equivalent. A♯ is white, indicating that B♭ is the correct name for that note in that scale.

In an alternative form the A♯ could appear as a brighter shade of yellow, still indicating that it is not the correct note name for the F major scale, while still demonstrating that it is higher in all respects, that is prismatically, alphabetically and eventually aurally to the note A directly to the left of the note F. This alternative form can be utilised for all the enharmonic notes that currently appear on the device as shown in the drawings in white triangular segments.

The triangular segmentation on the device is highly relevant. Using the enharmonic equivalent C♯/D♭ scale as an example it will be apparent that the upper triangular segment contains the C♯ and as such demonstrates that it is higher in all respects to the preceding C, not only alphabetically but prismatically and in the presently described version of the device, aurally. Consequently its enharmonic equivalent D♭, appears in the lower triangular segment demonstrating that it is lower in all respects to the following D. This becomes even more significant with the acquisition of further musical knowledge, i.e. the device helps the user to identify those scales which are considered the flat scales (the scales which incorporate flat notes) and the sharp scales (those scales which incorporate sharp notes).

By utilising the reference rings in conjunction with a predetermined coding system, it is possible to provide a device that will maintain symmetry of form and the coding system will maintain accessibility by the user because the user will be able quickly to identify the relationship of the integers by the coding system.

In another form of the invention the coding system comprises a tactile system which would be of particular benefit to the sight impaired user. One such tactile system is the utilisation of patterns of dots as used by the Braille method. A tactile system will employ the same logic as that described for the colour coding. An example of the tactile system when the device is adapted to demonstrate the relationship of the notes of a musical scale is by using the C major scale as it appears vertically, the notes C D E F G A B would receive their corresponding Braille characters in accordance with the Braille system. Included in each segment, there is preferably a further Braille character indicating the scale to which the note is diatonic. For example, the segment containing the note D on the reference ring 23*b* would contain a Braille symbol for the note D and a smaller Braille symbol for the letter c, demonstrating that it is the note D diatonic to the C major scale. Consequently the same logic can be utilised for coding under this system as for the colour coding system.

General description of the operation of the software

When the device is powered up by moving the on/off switch 40 to its on position, the system goes through an initialisation phase then into an idle state. The initialisation phase will configure a port for communication with the analog interface for initialising the visual or aural response, and for loading the tables which are used to convert the values to pitch information. While in its idle state, an idle loop samples the mode select switch and samples the active switches at predetermined timed intervals.

If the mode select switch 41 indicates a play mode, the program immediately branches to the play mode, regardless of the state of the active switches.

If the mode switch is not in a play mode the active switches are read. When a key of an active switch is pressed, the software then branches to the appropriate chord or sequence modes as determined by the mode select switch 41.

When the device is configured to demonstrate the relationship of the notes of a musical scale, three modes of operation are employed, these being respectively, the Chordal, Sequence and Play mode.

In chordal mode the notes selected on reference rings 23*a,* 23*c* and 23*e* are selected to play a triad sequence. The notes are first played in sequence for approximately one second each, then all three notes are played together for approximately one second. The length of time of sounding the notes is preferably one second but this time can be varied as will be understood by those skilled in the art.

The notes sounded in the trial sequence are formed from notes within the sounding octave defined by the reference ring 23*a,* that is if the key displaying the character C on the reference ring 23*a* is pressed, the other two notes played will be in the range C to the next higher B. Playing of the triad sequence is initiated by pressing the key on the reference ring containing the desired character when it is in the active strip. This causes the reference rings 23*a,* 23*c* and 23*e* to be read. The program then branches to the chord playing routines to play the triad sequence. When complete, the program returns to the idle routine where it checks the mode select switch and then checks whether any active switches have been pressed. The software can be adapted to play more than three note chords.

Sequence Mode

The sequence mode is effectively a scale and mode playing mode. Starting from a root note which in this example is the character displayed on the active switch on the reference ring 23*a,* the device will play the notes in descending order on the active strip to deliver a series of notes in ascending musical order. The notes that are played are determined by the order of the notes on the active strip of the remainder of the reference rings 23*b* through 23*g.*

The purpose of this mode is to play a musical scale starting from the active switch on reference ring 23*a* which forms the root note. Consequently the playable notes are the octave starting at reference ring 23*a.* To complete a scale the 8th note is derived from the note selected by the active switch on the reference ring 23*a* but is played one octave higher.

In the sequence mode and using the C major scale as an example, by pressing the note C on the reference ring 23*a,* the device will play C Ionian mode or C major scale. If the first note pressed is the character D on the reference ring 23*b,* the device will play D Dorian mode and resolve to D one octave higher. Consequently depending upon which active key is first pressed, the device will play all the modes Ionian through to Locrian.

The sequence mode is activated by appropriate selection of the mode select switch 41. The reference rings are next rotated so the notes that are to be played are all aligned on the active strip. Sequence playing occurs when the active switch on ring 23*a* is depressed. At this point the active switches of all seven reference rings are scanned. The software then branches to the sequence playing routine and plays the seven notes selected by the active switches on the reference rings in sequence each for one second then plays the eighth note for one second. At the end of the sequence the program returns to the idle state where it checks the mode select switch 41 and also checks whether any active switches on any of the reference rings have been pressed.

Whenever a sequence has been played, any of the reference rings can be rotated to form a new sequence. The new sequence will be played whenever the active switch on the reference ring 23*a* is pressed.

Whenever a scale or mode has been played, any of the reference rings can be rotated to bring different characters into alignment on the active strip to form a new sequence. The new sequence will be played when the active switch on the reference ring 23*a* is pressed.

Play Mode

In the play mode the device acts as a keyboard. Whenever any active switch is pressed a note will be sounded for however long that switch is pressed. More than one active switch can be pressed at once to allow chords to be played. The play mode is selected by shifting the mode select switch 41 to play mode. Before this is done however all reference rings must be properly aligned.

When all active switches are properly aligned on the active strip the indicator light 45 will glow. In a modification of the invention, means can also be provided whereby alignment of the switches in the active strip can be facilitated by providing means to exhibit tactile indication when all the switches have been properly aligned on the active strip. Such tactile indication means can be formed by any suitable mechanical or electro/mechanical arrangement as will be apparent to those skilled in the art.

When the play mode is selected and provided all the active switches are properly aligned on the active strip, all seven reference ring positions are read. The active switch on reference ring 23*a* is treated as the root note of an ascending octave. The other six reference rings are pitched to be within that octave that is any note lower in pitch than the root note is automatically raised an octave. Any active switch which is depressed will now sound a note within this octave.

To increase the playable pitch range, any of the reference rings 23*b* through 23*g* can be rotated to raise or lower the played pitch by a range of two octaves either side of the octave selected by the reference ring 23*a.* The audible range obtainable will depend upon the capabilities of the hardware to reproduce the frequencies. Consequently greater octave spans are achievable depending on the hardware used.

If the reference ring 23*a* is rotated to a new position then the play mode may be reselected by moving the mode select switch 41 to either of the modes then back to the play mode. This enables the program to re-read all of the reference ring positions to form a new octave based on the active switch on the reference ring 23*a*. Whenever a note is not being sounded, the play mode checks the position of the mode select switch 41 and will change to the new mode if it has been selected.

More Detailed Operation

The flow diagram shown in FIGS. 5 through 9 illustrate a detailed description of the operation of the software for this particular implementation of the device and the reading of the relative position of the active switches on the reference rings will now be described:

Each of the reference rings indexes into a specific position with each position corresponding to a unique aural or visual integer. To allow the system to operate, it is necessary to determine the particular indexed position of each reference ring. To do this, four switches are so connected to each reference ring that they will form a unique pattern of binary coded switch closures, with each pattern corresponding to a particular indexed position of the switch. In this implementation a switch closure corresponds to a logical 1.

The switch pattern employed in this particular example is as follows:

A=0000 (0)

A♯=0001 (1)

B=0010 (2)

C=0011 (3)

C♯=0100 (4)

D=0101 (5)

D♯=0110 (6)

E=0111 (7)

F=1000 (8)

F♯=1001 (9)

G=1010 (10)

G♯=1011 (11)

To detect the operation of any of the switches on the active strip, each reference ring has a push button switch under the key which lies along the active strip. Each of these switches is an input to the processor.

Also provided is an electrical detent mechanism. Each reference ring has a switch that will indicate it is properly in its detent position. These switches are wired in series to the indicator light 45 which will glow when the reference rings are properly positioned. This feature is important when using play mode, as this mode cannot be entered until each reference ring is properly positioned.

Chord Mode

When chord mode is selected from the mode select switch 41, the software remains in its idle loop until any active switch is pressed. The program now branches to the 'chord' mode routine.

The first operation is to read all the active switches on the reference rings. The value of each switch is converted into a pitch value. The pitch values, each of which being the phase increment value required to sound a note of a particular pitch for each possible playable note, are stored in a note table. The note table contains pitch values to play notes in the range A=110 Hz to A=880 Hz.

Starting with the active switch on the reference ring 23*a* its value is read and the value of 24 is added. This is because the base octave used in chord mode starts at A=220 Hz which is the 24th entry in the note table. Proceeding with the other active switches, if the switch value which is read is greater than that of the active switch on the reference ring 23*a*, a value of 12 is added to the read switch value. If the read switch value is less than that of the active switch on the reference ring 23*a*, a value of 24 is added to the read switch value to pitch the note up one octave. These phase increment values are stored in an array for later use when the notes are sounded. Each value in the array corresponds to a reference ring.

To sound a note or notes, the chord mode routine issues a table of commands to the routine to produce the audible or visual response. In the case of a device configured to demonstrate the relationship of the notes of a musical scale, these commands consist of a phase increment value which is used to set the pitch and an attack/sustain/decay duration value.

In chord mode the commands are as follows:

Play the note corresponding to the active switch on reference ring 23*a*. Attack and sustain for 1 second. Decay for 30 mSec.

Play the note corresponding to the active switch on the reference ring 23*c*. Attack and sustain for 1 second. Decay for 30 mSec.

Play the note corresponding to the active switch on the reference ring 23*e*. Attack and sustain for 1 second. Decay for 30 mSec.

Play the combined notes corresponding to the active switches on the reference rings 23*a*, 23*c* and 23*e*. Attack and sustain for 1 second. Decay for 30 mSec.

At the end of these four operations the software returns to its idle state.

Sequence Mode

Operation in sequence mode is essentially identical to chord mode except that the notes corresponding to the active switches on all seven reference rings are played in sequence at one second intervals. The eighth note is played for one second but one octave higher than the root note.

Play Mode

The play mode is entered when the mode select switch is moved to its single play mode position. The software stays in a loop until all the active switches are properly detented and at that stage the values of all active switches are read to form a table of note values within an ascending octave based on the value of the active switch on the reference ring 23*a*.

The active switches are now continuously monitored until the key of an active switch is depressed. As any reference ring 23*b* through 23*g* is rotated, its new pitch status is stored. If any keys of the active switches are depressed the notes corresponding to these active switches keys are played. Whilst a key or keys are pressed the keys are sampled at 38 mSec intervals. For each key in the octave strip, four playing conditions exist between each 38 mSec interval.

1. Key has just been pressed. This tells the note sounding routine to attack and hold that note for 38 mSec.
2. Key has just been released. This tells the note sounding routine to decay that note to zero volume and hold it there.
3. Key is still pressed after a previous sampling. The sounding routine sustains this note for 38 mSec at full volume.
4. Key is still released after a previous sampling. The sounding routine sustains this note for 38 mSec at zero volume.

Once the play mode has been entered, this mode is sustained until the mode select switch is moved.

Note Generation

Each note is generated by digital means. Notes are formed by supplying a digital sample of the waveform to a digital to analog converter at the sample note. For this device, a sample rate of 8000 samples per second is used. Provided that the samples are supplied at a rate greater than twice the highest frequency component of the note which is being sounded, proper reconstruction from samples will occur. To generate the individual samples a 'phase-advance' technique is used.

By way of example, to create a sound having a fundamental frequency of 500 Hz each sample will represent a phase advance of:

$$\frac{2\pi}{8{,}000} \times 500 = \frac{2\pi \times 5}{80} = \frac{\pi}{8} \text{ radians}$$

To generate the particular note timbre there is stored or computed a full cycle of the required waveform type. Each new sample phase value is formed by adding the phase increment to the previous phase value modulo 2π. From the new phase value the sample value can be obtained by table look-up or computation. To prevent unnecessary phase jitter the phase value is accurate to 16 bits. Thus if the table look-up is used, interpolation is necessary. Preferably, but not necessarily, the device uses triangle waves which are computed directly from the phase values.

To produce polyphonic sounds with attack and decay, each note has its sample value computed. Then each sample value is multiplied by an envelope value for that particular note. Finally, these products are added together to form the sample value.

Envelope control: The envelope function provides attack, sustain or decay to any note as it is played. The envelope produces a note sample value which is multiplied by the associated note sample value to set the note loudness.

During the attack phase the note amplitude is increased linearly over 256 samples.

During the decay phase the note amplitude is decreased linearly over 256 samples.

For the sustain function, the note amplitude is held at zero or maximum amplitude for the entire duration that the sustain function is called. In the play mode the active strip is sampled once every 300 sample periods to determine whether notes should be in the attack, sustain or decay phases.

During attack and decay the amplitudes are incremented or decremented for a 256 sample period then automatically sustained until the 300 sample periods are complete whereupon the active switches are sampled again.

In sequence and chord mode, the attack/decay functions operate for 300 sample periods. The sustain however is held for 8000 sample periods (1 second). In these two modes the active strip is sampled until an active key is pressed. From then on all playing is performed automatically without scanning the active strip until the sequence of notes has been played.

In a modification of the invention, when the device is configured so it can be used as a music teaching aid, it may include a metronome facility to generate a repetitive audible beat in the form of a staccato pulse of a single tone or a burst of combined tones whether tonal or atonal, white noise or other desired audible signal. The audible beat can be augmented by a visual signal, such as a light emitting diode or the like. The pulse can be generated by any known electronic or electromechanical means as is known in the art and means will preferably be provided so that the tempo of the beat can be varied as desired.

While the foregoing description illustrates a particular shape and construction of the device which in a highly preferred is to be used as a music teaching aid, it is to be understood that a wide variety of applications can be undertaken using the precepts and principles of a device having a plurality of reference rings as herein described. In addition the physical shape, size and construction can be varied. For instance, the device could be cone shaped, or barrel shaped or it may consist of concentric rings. As will be apparent to those skilled in the art, the particular shape and construction of the device can be changed, adapted or enlarged to suit the particular requirements.

The foregoing describes preferred forms of the invention and it is to be understood the scope of the invention is not to be limited to the specific forms described. Modifications, improvements and variations to the preferred forms of the invention may occur to those skilled in the art who come to understand the principles and precepts of the invention. Accordingly the scope of the patent to be issued herein is not to be limited to the specific embodiments and is to be limited only by the scope of the invention as defined in the appended claims.

I claim:

1. An electronic information aid comprising:

a plurality of reference rings each of which is independently movable and maintained in a predetermined spatial relationship, each reference ring having a plurality of segments each of which is identifiable by a predetermined coding system such that when selected segments of the reference rings are aligned in accordance with the predetermined coding system into an array of segments, the aligned segments will represent a predetermined relationship between the segments;

activation means wherein one or more of only the segments in the array of segments are activatable; and response means wherein a visual or audible response in initiated by the activation of one or more of the segments in the array of segments.

2. The information aid of claim 1, wherein each segment displays indicia representing a musical note on the chromatic scale, the construction and arrangement being that when the segments are aligned in the active strip in accordance with the coding system, the segments within the active strip will represent the notes of a musical scale.

3. The information aid of claim 2, wherein when the segments are aligned in the active strip to represent the notes of the musical scale, corresponding segments of each successive reference ring will also represent the notes of a musical scale.

4. The information aid of claim 1, wherein the audible response comprises the production of a single note.

5. The information aid of claim 1, wherein the audible response includes a tone program which comprises the production of a series of notes.

6. The information aid of claim 2, wherein the audible response includes a tone program which comprises the production of a chord.

7. The information aid of claim 1, wherein the predetermined coding system comprises a unique tactile pattern applied to each of the segments.

8. The information aid of claim 1, including more than one active strip.

9. The information aid of claim 1, wherein each reference ring comprises a sleeve mounted for individual rotation on a housing, means being provided on the housing to maintain each reference ring in a predetermined spatial relationship with the remainder of the reference rings.

10. The information aid of claim 2, wherein the means to produce an audible response comprises a software program having a chordal mode of operation, a sequence mode of operation and a play mode of operation.

11. An electronic information aid comprising:

a plurality of reference rings, each of which is independently movable and maintained in a predetermined spatial relationship, each reference ring having a plurality of segments each of which is identifiable by a predetermined coding system such that when selected segments of the reference rings are aligned in accordance with the predetermined coding system into an array of segments the array of segments will represent a predetermined relationship between the segments;

activation means where one or more of only the segments in the array of segments are activatable; and response means in which a visual or audible response can be initiated by the activation of one or more of the segments in the array.

12. The information aid of claim 11 wherein each segment displays indicia representing a musical note on the chromatic scale, the array of segments being comprised of a segment in each of successive reference rings whereby the array of segments represents the notes of a musical scale.

13. The information aid of claim 12 wherein the response means produces a single note corresponding to the activated segment in the array of segments.

14. The information aid of claim 13 wherein the response means produces a musical chord corresponding to a plurality of segments in the array of segments which when activated cause the activation means to initiate the chordal audible response in the response means.

15. The information aid of claim 11 or 12 wherein the array of segments is a strip of aligned segments.

* * * * *